Feb. 17, 1970  J. J. REJSA  3,495,442
THICKNESS MEASURING INSTRUMENT
Filed June 21, 1967  2 Sheets-Sheet 1
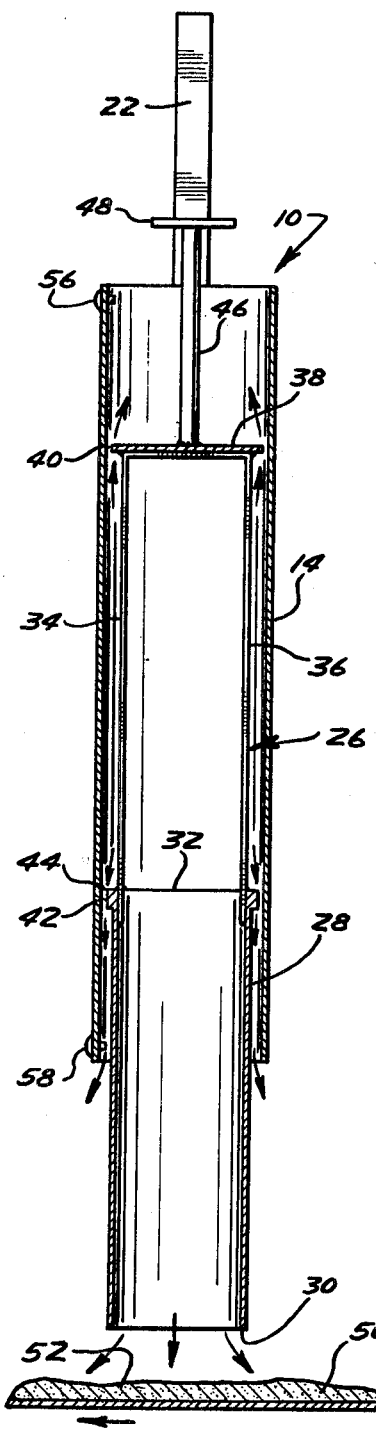
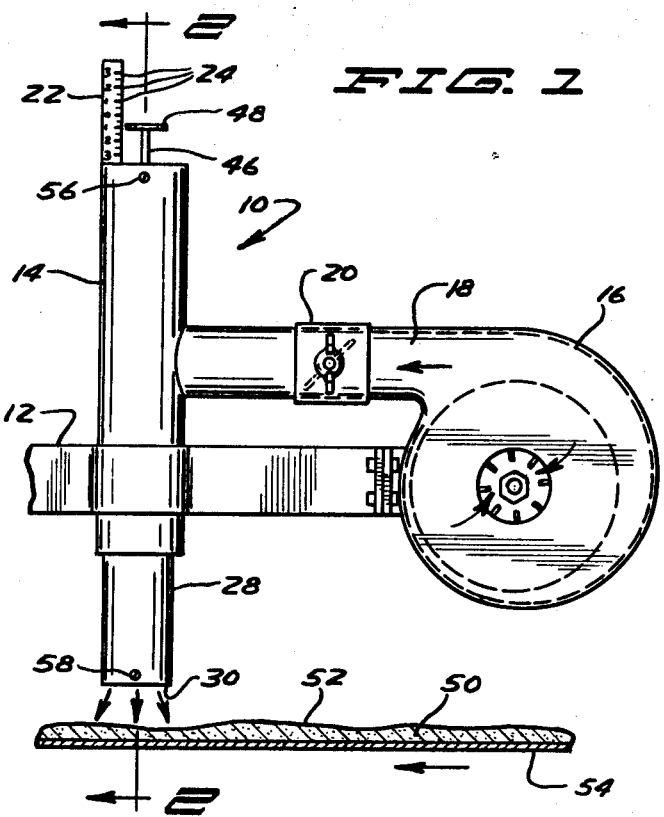
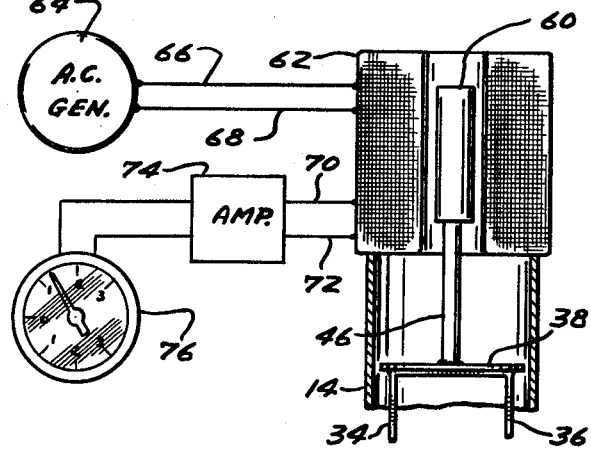
INVENTOR.
JACK J. REJSA
BY
James V. Harmon
ATTORNEY Feb. 17, 1970     J. J. REJSA     3,495,442
THICKNESS MEASURING INSTRUMENT
Filed June 21, 1967     2 Sheets-Sheet 2

INVENTOR.
JACK J. REJSA
BY
*James V. Harmon*
ATTORNEY

United States Patent Office 3,495,442
Patented Feb. 17, 1970

3,495,442
THICKNESS MEASURING INSTRUMENT
Jack J. Rejsa, Minneapolis, Minn., assignor to The Pillsbury Company, Minneapolis, Minn., a corporation of Delaware
Filed June 21, 1967, Ser. No. 647,824
Int. Cl. G01b 13/04
U.S. Cl. 73—37.6
9 Claims

ABSTRACT OF THE DISCLOSURE

A thickness measuring instrument consisting of a nozzle through which air is expelled to maintain the nozzle at a predetermined distance above the surface of an article. The nozzle is mounted concentrically within a tubular housing for free sliding movement along its major axis. Air introduced through the housing escapes in part through the nozzle and is expelled against the article being measured. The remaining portion of the air passes between the inside surface of the housing and a pair of spaced apart annular members secured to the nozzle. The annular members are slightly smaller than the inside diameter of the housing so as to define a pair of annular air gaps that function as frictionless bearings for centering the nozzle within the housing.

The present invention relates to measuring and testing equipment and more particularly to an improved thickness measuring instrument of the type in which the instrument does not contact the article being measured.

A variety of instruments have been previously proposed in which a jet of air or other gas is directed against the object that is to be measured. Most of these prior devices employ a pressure measuring gauge connected to the air supply duct as a read-out instrument. In these devices, the pressure measured on the gauge will vary as a function of the distance of the object from the jet. It has also been previously proposed to employ an air jet exhausted through a pivotally supported nozzle for measuring the presence or absence of a paper web. When the paper web breaks, the nozzle is allowed to fall thereby operating a switch used to shut off the paper machine.

It is an object of the present invention to provide an improved thickness measuring instrument having the following capabilities and advantages: (a) the ability to directly and continuously measure changes in the elevation of the upper surface of a moving object having a variable thickness; (b) the ability to continuously sense and simultaneously indicate variations in the thickness of an object and display a continuous infinite number; (c) a means for maintaining the moving member in a predetermined spacing from the object being measured and for concurrently maintaining the moving member in spaced relationship from its supporting structure; (d) a provision for a moving member pneumatically separated from the object being measured with an indicating pointer mounted rigidly on the moving member for displaying changes in the thickness of the object; (e) a provision for indicating the thickness of an object at any remote point; (f) a nozzle including a gas jet concentrating means for directing and concentrating the jet at a predetermined point below said nozzle; (g) a plurality of horizontally spaced movable thickness measuring members with a provision for indicating the average height of the several movable members.

These and other more detailed and specific objects will become apparent in view of the following specification and drawings wherein:

FIGURE 1 is a side elevational view of an apparatus embodying the invention.

FIGURE 2 is a vertical transverse sectional view taken on line 2—2 of FIGURE 1.

FIGURE 3 is a partial vertical sectional view of an apparatus embodying a modified form of the invention.

FIGURE 4 is a partial vertical view of another modified form of the invention.

FIGURE 5 is a vertical sectional view of another modified form of the invention.

FIGURE 6 is a side elevational view of an apparatus embodying the invention as employed for measuring the volume of an article such as a cake.

Briefly, the present invention provides an apparatus having a hollow movable nozzle for directing a stream of gas downwardly onto the surface of an article for indicating the thickness of the article. The gas stream maintains the nozzle at a predetermined distance from the article due to the ground effect produced by an air cushion between the article and the nozzle. A suitable air source such as a centrifugal blower is connected to the nozzle for providing flotation air. The nozzle is preferably mounted for vertical rectilinear sliding motion. It has associated with it a pair of longitudinally spaced air gaps communicatively connected to the source of air. A portion of the air supplied for flotation is allowed to escape through the gaps thereby suspending the nozzle in a predetermined position and allowing frictionless rectilinear movement thereof. An indicator member such as a pointer or variable coupled transformer is used for indicating the position of the nozzle. In one modified form of the invention, a plurality of the nozzles are linked together to provide a single read-out which varies in accordance with the relative positions of the several nozzles.

In FIGURES 1 and 2 is shown a height measuring instrument 10 embodying the present invention. The instrument includes a supporting standard 12 to which is secured a framework or housing member 14 composed of a vertically disposed hollow cylinder, a blower 16 of the centrifugal type and a connecting duct 18 having a flow control valve 20. At the top of the cylinder 14 is rigidly secured a scale member 22 having visible markings 24. Mounted for rectilinear and vertical sliding movement within the housing 14 is a movable nozzle 28 composed of a lightweight hollow tube having a nozzle outlet 30 which serves as an outlet for air introduced through duct 18. The upward end 32 of the nozzle 28 is also open and has secured to it vertically disposed parallel rods 34 and 36 which are rigidly connected at their upward ends to a disc 38 which is slightly smaller than the inside diameter of the housing 14 to define an annular gap 40 which serves as an air bearing that will be described more fully below. I have found that in general the nozzle 28 should be as light in weight as possible. While it can be formed from a variety of materials, I have found that aluminum tubing having a thickness of 0.025 inch is satisfactory. The upward end of the nozzle 28 is provided with a lateral flange 42 which defines a second annular gap 44 that also functions as an air bearing. A rod 46 is welded to the upward surface of the disc 38 and an indicator or pointer comprising a disc 48 is rigidly secured to the top of rod 46. As best seen in FIGURE 1, the edge of the disc 48 is located adjacent to the scale member 22 so that changes in the vertical position of the nozzle 28 can be easily seen in the corresponding numbers on the scale 22 recorded.

Suitable stops such as screws 56 and 58 are provided at the upper and lower ends respectively of the cylindrical housing 14 to prevent the nozzle member 28 from falling out.

Located a short distance below the nozzle outlet 30 is an article 50 that has variations in the elevation of its upper surface 52. The article 50 can, for example, comprise a strip of dough resting upon a conveyor belt 54 of fixed elevation travelling beneath the nozzle outlet 30.

The operation of the apparatus will now be described. To begin operation the blower 16 is started. The valve 20 will initially be fully open. The air rushing through duct 18 into the housing 14 will pass through the gap 40 to provide a first air bearing and through the gap 44 to provide a second air bearing. These bearings will keep the nozzle member 28 centered within the housing 14 and maintaining it out of contact with the housing. Most of the air entering the housing will escape through the outlet 30 of nozzle 28. Since the nozzle member 28 is free to move vertically within enclosure 14 the reaction produced by the air escaping through outlet 30 will initially move the nozzle 28 upwardly until the disc 38 strikes the screw 56. At this stage of the start-up procedure, the valve 20 is closed just sufficiently to enable the nozzle 28 to fall within the enclosure 14, i.e. so that its own weight is just sufficient to overcome the reaction due to the air escaping from the nozzle outlet 30.

The lower end 30 of the nozzle 28 will then assume a predetermined position above the upper surface 52 of the article 50 that is being measured. This distance will generally be on the order of from about 1/8 inch to 1 inch with 1/4 inch being typical. The conveyor 54 is then started. As the surface 52 moves beneath the nozzle 28, the nozzle 28 and pointer 48 will move up and down corresponding to changes in the elevation of the surface 52 due to the ground effect produced by the air cushion between the piston and the surface. Since the vertical position conveyor 54 is fixed, the movement of the nozzle will indicate changes in thickness. During operation, the piston will continue to move up and down to maintain a air cushion of constant thickness above surface 52. Since the air is allowed to escape continuously through the gaps 40 and 44, vertical motion of the nozzle 28 will be substantially frictionless. It is important to note that there is no contact between the free end of the nozzle member 28 and dough sheet. Accordingly, operation will not be adversely effected by the dough composition whether sticky or dusty.

Refer now to FIGURE 3 which shows a modified form of indicator means. In the modified construction the rod 46 has rigidly secured to it a a permeable soft iron member 60 centered within a transformer coil 62 with primary and secondary windings. The primary winding is supplied with the current from an alternating current generator 64 through coductors 66 and 68. The secondary winding is connected by conductors 70 and 72 to an amplifier 74 which is in turn conductively connected to a remotely located meter 76. During operation, the movement of the iron core 60 within the coil 62 will vary the flux coupling between the primary and secondary windings. Accordingly, the current through lines 70 and 72 and the meter 76 will vary in accord with elevation of the nozzle 28. The embodiment illustrated in FIGURE 3 is preferred where a remotely located read-out is needed.

Refer now to FIGURE 4 which illustrates another way in which the invention can be used. As seen in the figure, the thickness indicating instrument 10 is mounted on a supporting standard 77 which is itself secured to a framework 79 having two horizontally spaced parallel rolls 80 and 81 mounted at its ends. The rolls are driven and given feed directions to impart motion to an endless belt conveyor 83 which has secured to its a plurality of transversely extending guides 85 that serve as holders for articles that are to be measured, in this case cakes 86. The cakes 86 pass during operation is succession beneath the nozzle 28 of the instrument 10. The meter 76 continuously indicates the changes in the height of the upper surface of each cake as it travels beneath the nozzle 28. The read-out indicated on the meter 76 can be used for the purpose of quality control or for measuring the effect of changes in the composition and processing conditions used.

Refer now to FIGURE 5 which illustrates a modified form of nozzle in accordance with the invention. A centrally located axially extending core 89 having a generally tear drop shape including a pointed upward end 82 and an enlarged center portion 92 and a conical nose portion 93 is supported within the housing 14 by means of a spider 94. The inner wall 95 of the low portion of the nozzle tapers centrally proceeding from the upper to the lower end thereof parallel to the surface of the conical portion 93 of the core so as to thereby define an annular frustoconical jet orifice 96 which functions to direct the escaping gas so as to produce a high pressure concentration of gases at 97. With other conditions remaining the same this will float the nozzle 28 at a greater distance from the article 50 with no sacrifice in sensitivity.

The invention will now be described in connection with FIGURE 6 as it is applied for measuring the volume of a freshly baked cake 98. The apparatus of FIGURE 6 includes a plurality of cylindrical housings 14 each mounted vertically and positioned in horizontal alignment relative to one another. Each housing 14 is rigidly supported as by means of a manifold 100 into which air is supplied from a blower 102. The blower 102 forces air into the manifold 100 through a valve 104 in duct 106. The air entering manifold 100 flows to each cylindrical housing 14 through one of a plurality of ports designated 108. The nozzle and air bearing arrangement within each of the cylinders is identical to that described above in connection with FIGURES 1 and 2 except for the read-out portion of the apparatus which will now be described.

As shown in the figure, identical rods 110, 112, 114 and 116 extend vertically from the outer four nozzles 28. A much longer rod 118 extends vertically from the central nozzle 28. Pivotally secured between the upward ends of the rods 110 and 112 is a link 120. A similar link 122 is pivotally secured between the ends of the rods 114 and 116. A beam 125 is pivotally secured at its ends to the links 120 and 122 by means of pivots 124 and 126. The upward end of the rod 118 is pivotally secured at the center of the beam 125 by means of a pin 128. A beam 125 is connected to the beam 130 by means of vertically disposed links 132 and 134 by means of pivotal connections at the upper and lower ends of the links. The beam 130 is pivotally secured at its center by means of a pivot pin 133 to an arm 135, one end of which is pivotally fastened at 138 to a support 140. The vertical position of the support 140 can be changed by the adjustment of a screw 142 to thereby zero arm 135 with reference to a scale 146 provided at the upward end of a bracket 148.

The relative lengths of the lower arms on either side of elements 124, 126, 132, 134 and 136 each has a predetermined value so that the read-out indicated by the position of indicator arm 135 on the scale 146 represents the volume of the cake 98 positioned simultaneously beneath all of the nozzle 28. When five nozzles 28 are provided for measuring the volume of cake, the following constants can be used. The lateral distance of links 132 and 134 from pivot 128 is 47.7 and from pivots 120 to 126 the lateral distance is 2.3. The links 120 and 122 have their end pivots spaced at distances of 19.2 and 28.5 from the pivots 124 and 126 as the case may be. When these constants are employed, the position of the arm 135 on the scale 146 will represent a true indication of the volume of the cake 98.

I claim:

1. A thickness measuring instrument comprising a housing, a hollow movable nozzle for directing a stream of gas onto the surface of an article the thickness of which is to be determined, said gas stream maintaining the nozzle at a distance from the article by reason of ground effect produced by an air cushion between the article and the nozzle, an air source connected to the nozzle for providing said stream of gas, the free end of the nozzle being mounted for movement along an axis extending parallel to the gas stream, bearing means operatively associated with the housing and the nozzle for allowing free movement of the nozzle along the path of motion, an indicator member connected to the nozzle for displaying the position of the nozzle relative to the housing due to movement of the nozzle on its path of motion, means provided at the outlet end of the nozzle for establishing a converging jet to provide a high pressure zone located adjacent to said outlet end.

2. The apparatus according to claim 1 wherein the means for establishing a converging jet comprises a tapered annular nozzle opening defined by a converging internal nozzle wall and a central core member having a tapered wall positioned adjacent the inside wall of the nozzle, said core member being suspended centrally within the nozzle and spaced therefrom.

3. An apparatus for measuring the volume of an article comprising a plurality of movable sensing jet nozzles, horizontally disposed links connecting the nozzles together, an indicator arm operatively associated with the links whereby changes in the position of the indicator arm will vary as the function changes in the position of each of the jet nozzles.

4. The apparatus according to claim 3 wherein the links are pivotally connected together and the length of the arm portions on each side of pivot points is selected such that the resulting movement of the indicator arm will vary as a function of the volume of an article located beneath the several jet nozzles.

5. A thickness measuring instrument comprising a housing, a plurality of hollow movable nozzles for directing streams of gas onto the surface of an article the thickness of which is to be determined, said gas maintaining each nozzle at a predetermined distance from the article by reason of the ground effect produced by an air cushion between the article and each nozzle, said nozzles being movably linked together to transmit the motion of one nozzle to an other in the opposite direction, said plurality of nozzles having a single read-out which varies in accordance with the relative positions of the several nozzles, an air source connected to each nozzle for providing said stream of gas, the free end of each nozzle being mounted for movement along an axis extending parallel to the gas stream, bearing means operatively associated with the housing and each nozzle for allowing free movement of each nozzle along the path of motion.

6. A thickness measuring instrument comprising a housing, a hollow movable nozzle for directing a stream of gas onto the surface of an article the thickness of which is to be determined, said gas stream maintaining the nozzle at a distance from the article by reason of ground effect produced by an air cushion between the article and the nozzle, an air source connected to the nozzle for providing said stream of gas, the free end of the nozzle being mounted for movement along an axis extending parallel to the gas stream, bearing means operatively associated with the housing and the nozzle for allowing free movement of the nozzle along the path of motion, said housing member comprises a hollow cylinder and an air bearing means provided between the nozzle and the housing for centering the nozzle within the housing, a pair of spaced apart annular members on the nozzle located within the housing, each annular member having a diameter slightly less than the inside diameter of the housing to thereby define a pair of annular air gaps for centering the nozzle within the housing and a source of air connected to the air gaps for producing a stream of air through each gap, an indicator member connected to the nozzle for displaying the position of the nozzle relative to the housing due to movement of the nozzle on its path of motion.

7. A thickness measuring instrument comprising a housing, a hollow movable nozzle for directing a stream of gas onto the surface of an article the thickness of which is to be determined, said gas stream maintaining the nozzle at a distance from the article by reason of ground effect produced by an air cushion between the article and the nozzle, an air source connected to the nozzle for providing said stream of gas, the free end of the nozzle being mounted for movement along an axis extending parallel to the gas stream, bearing means operatively associated with the housing and the nozzle for allowing free movement of the nozzle along the path of motion, a pair of indicator members, one of said members being rigidly mounted upon the nozzle and the other of said members being mounted upon the housing, one said indicator member having visible markings formed thereon for displaying the position of the moving member.

8. A thickness measuring instrument comprising a housing, a hollow movable nozzle for directing a stream of gas onto the surface of an article the thickness of which is to be determined, said gas stream maintaining the nozzle at a distance from the article by reason of ground effect produced by an air cushion between the article and the nozzle, an air source connected to the nozzle for providing said stream of gas, the free end of the nozzle being mounted for movement along an axis extending parallel to the gas stream, bearing means operatively associated with the housing and the nozzle for allowing free movement of the nozzle along the path of motion, an indicator member connected to the nozzle for displaying the position of the nozzle relative to the housing due to movement of the nozzle on its path of motion, said nozzle comprising a hollow cylindrical sleeve having an inlet opening at its upward end, an outlet opening at its lower end, a plate member mounted within the housing, duct means communicating with the housing between the plate and the outlet end of the nozzle whereby the upward reaction of the air exhaust through the outlet opening of the nozzle will produce an upward force component upon the plate in a direction adapted to counterbalance the weight of the nozzle.

9. A thickness measuring instrument comprising a housing, a hollow movable nozzle for directing a stream of gas onto the surface of an article the thickness of which is to be determined, said gas stream maintaining the nozzle at a distance from the article by reason of ground effect produced by an air cushion between the article and the nozzle, an air space connected to the nozzle for providing said stream of gas, the free end of the nozzle being mounted for movement along an axis extending parallel to the gas stream, bearing means operatively associated with the housing and the nozzle for allowing free movement of the nozzle along the path of motion, an indicator member connected to the nozzle for displaying the position of the nozzle relative to the housing due to movement of the nozzle on its path of motion, a means operatively associated with the instrument for controlling the flow of air through said nozzle to produce a reaction force due to the escape of air from the outlet of the nozzle which is slightly less than sufficient to balance the weight of the nozzle such that the nozzle falls to a position spaced at a selected distance above the upper surface of the article whose thickness is to be measured.

References Cited

UNITED STATES PATENTS

| | | | |
|---|---|---|---|
| 3,138,014 | 6/1964 | Jorre | 73—38 |
| 3,194,055 | 7/1965 | Knobel | 73—37.5 |
| 3,246,507 | 4/1966 | Hyde | 73—37.5 |

LOUIS R. PRINCE, Primary Examiner

W. A. HENRY II, Assistant Examiner

UNITED STATES PATENT OFFICE

CERTIFICATE OF CORRECTION

Patent No. 3,495,442 February 17, 1970

Jack J. Rejsa

It is certified that error appears in the above identified patent and that said Letters Patent are hereby corrected as shown below:

Column 6, line 46, "an air space" should read -- an air source --.

Signed and sealed this 29th day of December 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents